Nov. 10, 1964  J. M. HARRISON  3,156,015
APPARATUS FOR MOLDING A PLASTIC ARTICLE
Filed Oct. 20, 1961
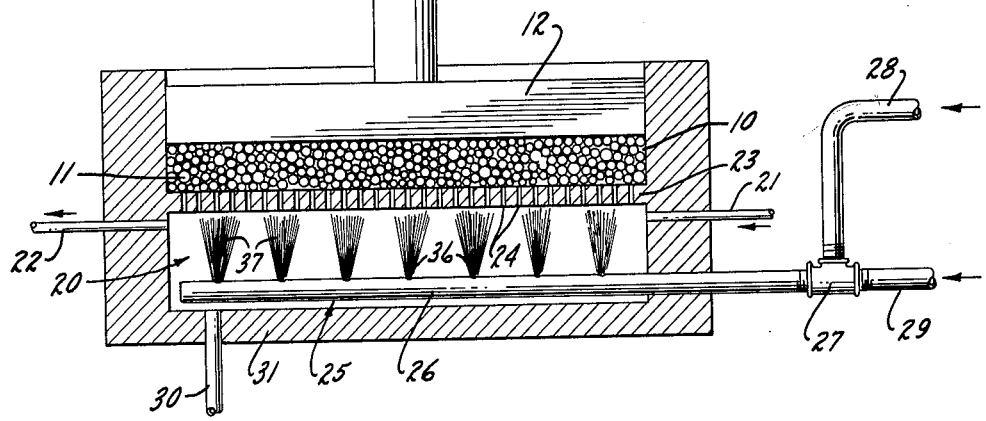
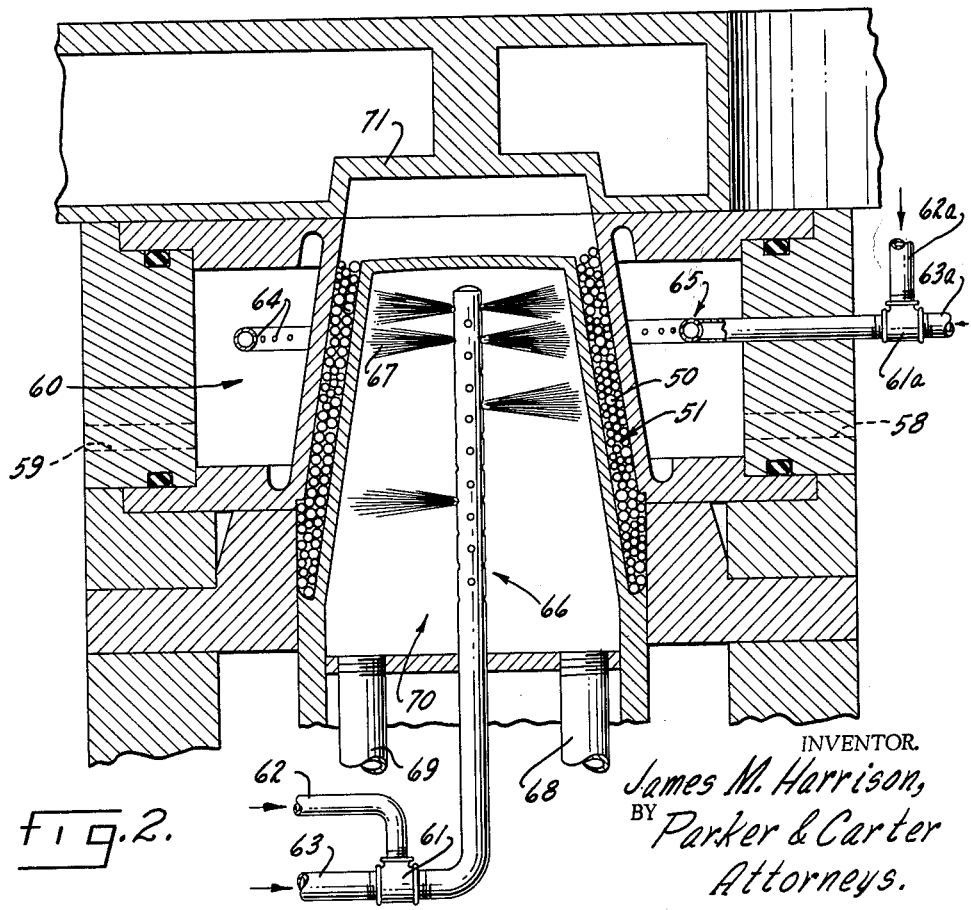
INVENTOR.
James M. Harrison,
BY Parker & Carter
Attorneys.

United States Patent Office 3,156,015
Patented Nov. 10, 1964

3,156,015
APPARATUS FOR MOLDING A PLASTIC ARTICLE
James M. Harrison, Fort Worth, Tex., assignor to Crown Machine & Tool Company, Fort Worth, Tex., a corporation of Texas
Filed Oct. 20, 1961, Ser. No. 146,504
4 Claims. (Cl. 18—38)

This invention relates to an apparatus for molding plastic articles, in particular, it relates to an improved cooling system for such molding mechanism.

An object is to provide an apparatus for efficiently molding and cooling plastic articles.

Another object is to provide an apparatus whereby the time is decreased for the steps of heating, molding and cooling plastic articles.

Another object is an apparatus for cooling molded plastic articles by dispersing cooling liquid more generally and efficiently over the surface of the mold.

Another object is an apparatus to provide cooling of molded plastic articles by using small droplets of cooling liquid which absorb the heat of the mold surface more quickly.

Another object is to provide an apparatus in which cooling liquid is prevented from accumulating in the cooling chamber adjoining the mold cavity.

Another object is an apparatus wherein a lesser amount of cooling liquid is required to provide adequate cooling effects.

Another object is an apparatus whereby the molding and cooling of plastic articles are obtained without requiring undue cleaning steps.

Another object is an apparatus wherein spot cooling of selected areas in the molding mechanism is possible.

Another object is an apparatus which allows smaller cooling equipment to provide adequate cooling effects.

The foregoing objects are accomplished along with other objects which will become apparent from time to time by the invention which will be described in detail and which is diagrammatically illustrated in the accompanying drawings wherein:

FIGURE 1 is a diagrammatic side view, partly in section, of a molding apparatus with a cooling chamber, and FIGURE 2 is a diagrammatic side view, partly in section, of a modified molding mechanism with an adjoining cooling chamber.

The diagrammatic molding mechanism of FIGURE 1 shows a molding cavity 10 wherein is deposited numerous plastic particles 11 to be molded by a closure member or piston 12 in conjunction with the application of heat. The finished and molded plastic article which would be produced by the type of molding apparatus illustrated in FIGURE 1 could be a generally flat sheet such as a ceiling tile. The configuration and shape of the molded article is not intended, however, to be a limitation because the method and apparatus described herein may be applied to a wide variety of molded plastic articles.

It is further intended that various types of plastic materials may be molded successfully with the present apparatus and method, and that it is not necessary to restrict such molding to discrete small plastic particles as particularly illustrated herein. For purposes of the present illustration, discrete plastic particles 11 are shown within the molding cavity 10. Particular plastic particles which are very well adapted for the method and apparatus are those which are generally known as foamable plastics or prefoamed plastic particles. These particles may be in the form of small particles or beads which have been charged with a foaming agent or gas. In particular, a plastic bead such as polystyrene may be exposed to a foaming or charging agent such as methylchloride, butane, heptane, or the like. The absorbed foaming agent or the bead charged with such foaming agent is subsequently expanded upon the application of heat. In practice, such beads are prefoamed prior to the final molding of the desired article. The purpose of the prefoaming is to partially distend or expand the beads by applying a temperature less than the temperature which would finally expand such beads to their fullest dimension. These prefoamed beads are then placed in a molding mechanism of the type schematically shown in FIGURE 1.

Various means may be used to feed the beads into the molding cavity but such means will not be described since they do not comprise a specific portion of this invention. It may be mentioned, however, that it is preferred to use a time-operation feed which is periodically matched with cycles of heating and cooling that participate in forming the molded plastic article. Accordingly, an appropriate hopper and slide valve arrangement may be used.

The plastic particles present in the cavity mold are softened to a flowable state by the application of heat. Sources of such heat may be many and may include metal dielectric electrodes, a hot liquid such as water, and hot gases such as steam. The heating agent shown here is steam which enters a chamber 20 adjoining the cavity mold 10. The source of steam is not shown but it enters the chamber through an inlet port 21 and escapes from the chamber through an outlet port 22. The wall 23 separating the cavity mold and its adjoining chamber may be structurally modified in that a plurality of passageways such as at 24 permit connection between the interior of the cavity mold and the interior of its adjoining chamber. Such minute passageways may be desired for those applications where direct steam heating or injection of the plastic particles within the mold is intended.

Following the molding of the plastic article within the cavity mold, the cooling means generally shown as 25 is placed in operation. The cooling means includes an extending conduit 26 having a plurality of openings or pores as at 36 along its length. The conduit 26 extends out of the chamber 20 where it is journaled to a common enclosure or juncture or T 27. One conduit or pipe or line 28 is joined to the T at one of its ends and the other end is joined to a source of high pressure creating means such as a compressed air cylinder or tank. Another conduit or pipe or line 29 is joined to the T at one of its ends and the other end is joined to a source of cooling liquid such as water. The air stream and the water stream are joined in the T 27 and continue as a mixture along the length of the conduit 26. The mixture of water and air is propelled through the pores 36 as a cloud or fog of fine water droplets or aspiration as shown at 37. An outlet 30 is in wall 31 of the cooling and heating chamber, and this outlet allows accumulated liquid to pass out of the chamber prior to the next application of steam heat.

FIGURE 2 shows a modified machine which is useful for molding containers and the like. The cavity mold 51 is heated and cooled by cycling steam and cooling liquid in adjoining chambers 60 and 70. A closure 71 may be adapted with heating means to mold that portion of the container article not adjoining a heating and cooling chamber. The cooling means are generally shown as 65 in the chamber 60 and as 66 in chamber 70, and they propel fogs of minute water droplets, as shown at 67, to cool the mold cavity 51. The cooling conduits have a plurality of pores or openings, as at 64, through which the mixture of high pressure air and water emerge as a fog of fine water droplets. The conduits continue outside of the chamber and are journaled to common junctures or T's 61 and 61a which have air conduits 62, 62a and water conduits 63, 63a joined thereto. The chamber 60 has an inlet port 58 and an outlet port 59 for respectively admitting steam and allowing steam to escape. Such ports may also serve as outlets for accumulated water within the chamber 60. The chamber 70 also has an inlet port 68 and an outlet port 69 to allow steam to enter and leave said chamber. Such ports may also be used to pass accumulated water out of the chamber 70. It is likewise apparent that separate outlets could be placed to allow escape of accumulated water from the respective chambers. The chamber 70 is therefore adapted to participate in the molding and cooling of the plastic articles 50 in the mold cavity 51.

It has been described herein that the cooling means operate successfully by combining a source of high pressure with a cooling liquid at a common juncture such as the T 27 in FIGURE 1, and thereafter conveying such combined high pressure and liquid into a chamber as fogs or clouds or fine water droplets propelled into said chamber under pressure. Advantages of this invention may also be obtained by providing separated air and water inlets to the chamber 20 of FIGURE 1. Thus, a cooling liquid such as water may be admitted into the chamber 20 of FIGURE 1 from a conduit such as 26 through openings such as 36. Such cooling liquid will be presented to the chamber as a spray rather than as a fog of fine water droplets. Concurrently with the admission of said water into the chamber, a source of high pressure may be connected to the interior chamber by an inlet which is not shown in the attached drawings. Such an inlet need only be a simple passageway located at any convenient point on the walls forming an adjoining chamber 20. Where the high pressure source is compressed air, such compressed air will be admitted concurrently with the water spray and pressure gradients will be created within the chamber as determined by the changing pressure levels within said chamber. The pressure levels will be changing because the pressure will be reduced by the various inlets and outlets connecting the chamber to the exterior, and by the continued creation of pressure from the outside pressure source.

The use and operation of my invention are as follows:

The molding of certain plastic articles, particularly from foamable plastic particles, involves cycles of heating and cooling whereby the plastic article is first molded by heat, is cooled, and then removed from the plastic molding machine. The more efficiently and the more quickly the cooling step is performed, then, of course, a greater number of plastic articles can be molded in a given period of time. In molding machines which use a cooling liquid such as water in the cooling cycle, it is desirable to remove such accumulated liquid from the chamber quickly so that said chamber may receive means such as steam to heat the cavity mold within the chamber.

The molding of plastic articles is preferably performed, in one practice, by preheating the cavity mold 10 by admitting steam into the chamber 20. A sufficient amount of steam and consequent heat is maintained in the chamber by use of suitable inlets and outlets. Following this preheating treatment, plastic particles or partially expanded plastic beads are placed in the cavity mold, the cavity closed by the piston 12 and then the beads are heated by additional amounts of steam which are admitted into the chamber or which directly contact the plastic particles by passing through numerous openings 24 in the wall 23 which separates the cavity mold from the adjoining heating and molding chamber. The application of heat mold the plastic article and such article is then cooled before removal from the molding machine. The cooling occurs by conveying a cooling liquid, such as water, into the chamber 20 and concurrently creating pressure gradients within said chamber so that following the cooling action of the water, said accumulated water is quickly expelled from the chamber by the forces of the pressure gradients within said chamber. The accumulated water is expelled from the chamber through an outlet suitably placed in one of the walls forming the cooling and heating chamber. A selected way to provide both water and the pressure gradients within the chamber 20 is to mix high pressure air and water in a common juncture or enclosure and then admit such mixed compressed air and water through a plurality of ports as a cloud o rfog of fine water droplets. Such practice has the additional advantage of dispersing the water more generally over the surface of the cavity mold and such small droplets tend to absorb the heat of the cavity mold more quickly.

The fog of fine water droplets is propelled into the chamber by the force of the compressed air which comprises a part of the water-compressed air mixture. This compressed air creates pressure gradients within the chamber which quickly expel the water which accumulates from the foregoing fine water droplets in the fog. Such a practice also requires less water to attain efficient cooling of the cavity mold than is possible where a water spray is used without high pressure to form small water droplets. An additional advantage is the spot cooling which is possible with the method. Appropriate bunching and spacing of the orifices or ports in the conduit permits the fog of fine water droplets to be propelled from selected areas in the conduit and against selected areas of the mold cavity.

It is understood that the compressed air and the cooling water may be provided from a wide range of pressure levels to obtain fogs of fine water droplets varying in the number and size of water droplets which make up said fog. Such a combination of pressures will be decided by the practitioner who will first consider the type of molding machine, the article to be molded and the particular operation he desires. The length and shape of the conduit which conveys the mixture of compressed air and water will also be varied according to the molding machine and the space available in the cooling and heating chamber. The size and number of openings, orifices or ports in said conduit may also be changed within a wide range. The cooling step has been practiced with particular success with a conduit wherein the total area of the openings or ports in said conduit add up to an area which is about 90 percent of the cross-sectional area of the conduit. It has been found that in a molding machine of the type which makes a plastic ceiling tile that the cooling time is reduced about 100 percent when a conduit of ½ inch diameter is used, and when an air conduit of ⅜ inch diameter is joined thereto. The pressure of the air is about 20 p.s.i., the pressure of the water is about 80 p.s.i., and the total area of the openings or ports in the conduit comprises about 90 percent of the total cross-sectional area of said ½ inch conduit.

The foregoing invention can now be practiced by those skilled in the art. Such skilled persons will know that the invention is not necessarily restricted to the particular embodiments presented herein. The scope of the invention is to be defined by the terms of the following claims as given meaning by the preceding description.

I claim:

1. In a plastic molding machine having a cavity mold and an adjoining chamber surrounding said cavity mold, the combination which includes a source of cooling liquid, means to convey said cooling liquid into the chamber, a compressed air source, means to communicate the interior of the chamber with said high pressure source simultaneously with the cooling liquid, and an outlet in said chamber whereby the cooling liquid is expelled from said chamber by the pressure gradients created therein.

2. The plastic molding machine of claim 1 further characterized by and including a plurality of fine ports in the means conveying said cooling liquid whereby the cooling liquid is admitted into the chamber as a plurality of fine sprays.

3. A molding machine as in claim 1 further characterized by and including a common enclosure wherein the cooling liquid and the compressed air are joined and mixed, and a conduit to convey said mixed air and liquid to the chamber.

4. In a plastic molding machine, the combination including a cavity mold, a wall spaced from the cavity mold to define an adjacent chamber, means to admit steam into said chamber, a conduit having a common enclosure at one end, a source of compressed air and a source of cooling water separately joined to said common enclosure, the other end of the conduit having a plurality of ports which communicate with the interior of the chamber, and an outlet in said chamber through which accumulated water is expelled, whereby the combined water and compressed air enter the chamber through said ports as multiple fogs of fine water droplets, and the accumulated water is expelled through said outlet by the gradient pressures within the chamber.

References Cited in the file of this patent

UNITED STATES PATENTS

| | | |
|---|---|---|
| 2,348,738 | Hofmann | May 16, 1944 |
| 2,836,848 | Zink et al. | June 3, 1958 |
| 2,899,708 | Donaldson et al. | Aug. 18, 1959 |
| 2,951,260 | Harrison et al. | Sept. 6, 1960 |
| 2,954,589 | Brown | Oct. 4, 1960 |
| 2,972,790 | McGahan | Feb. 28, 1961 |

FOREIGN PATENTS

| | | |
|---|---|---|
| 280,743 | Great Britain | Nov. 24, 1927 |